April 11, 1944.   C. J. WERNER   2,346,341
MOTOR CONTROL SWITCH
Filed April 14, 1942   2 Sheets-Sheet 1

INVENTOR
CALVIN J. WERNER
BY
Spencer, Hardman and Fehr
HIS ATTORNEYS

April 11, 1944.  C. J. WERNER  2,346,341
MOTOR CONTROL SWITCH
Filed April 14, 1942  2 Sheets-Sheet 2
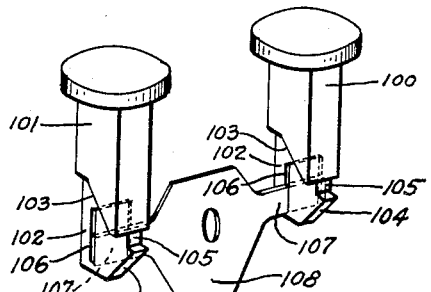
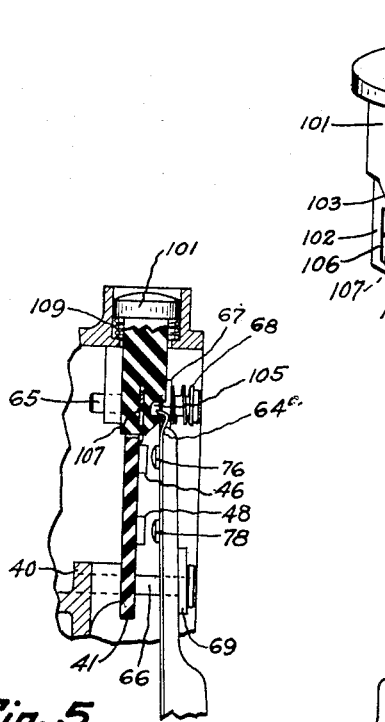
Fig. 5.
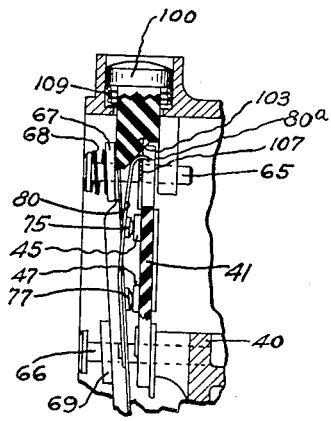
Fig. 6.
Fig. 4.
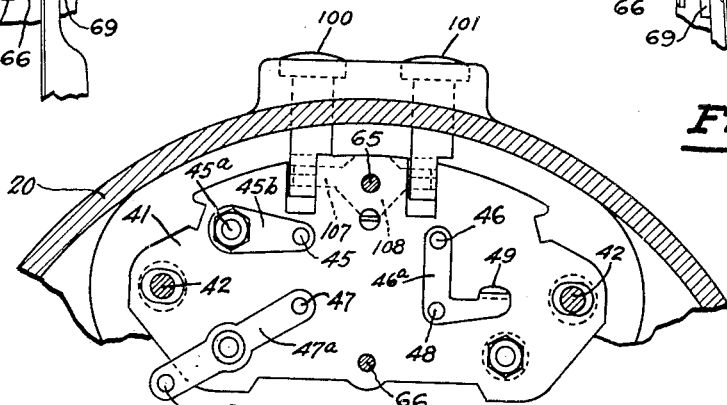
Fig. 7.
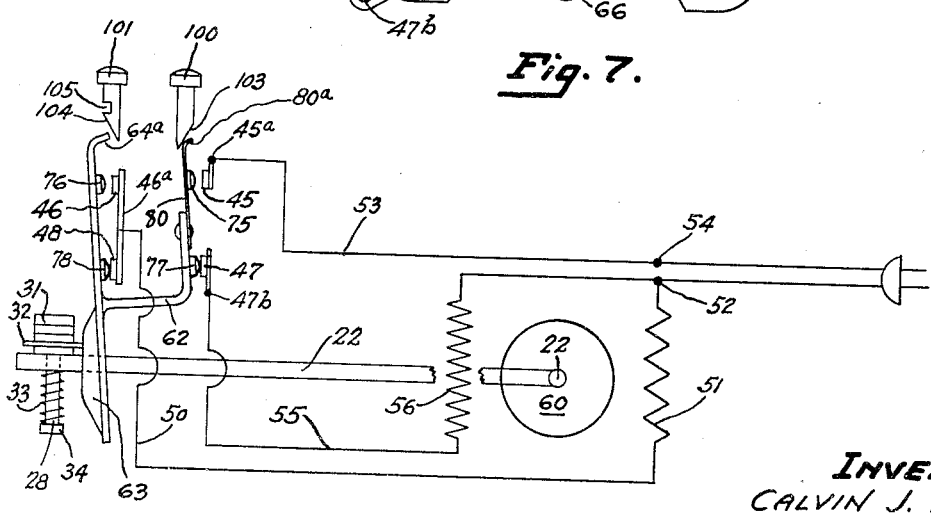
Fig. 8.
INVENTOR
CALVIN J. WERNER
BY
*Spencer, Hardman and Fehr*
HIS ATTORNEYS Patented Apr. 11, 1944

2,346,341

UNITED STATES PATENT OFFICE 2,346,341

MOTOR CONTROL SWITCH

Calvin J. Werner, Dayton, Ohio, assignor to General Motors Corporation, Detroit, Mich., a corporation of Delaware Application April 14, 1942, Serial No. 438,931

10 Claims. (Cl. 172—279)

This invention relates to improvements in electric switches and more particularly to switches adapted to control the operation of electric motors.

It is among the objects of the present invention to provide a switch adapted automatically to control an electric motor in accordance with its speed of operation so that when the speed of the motor falls below a predetermined value said switch will automatically break the motor circuits and stop motor operation thereby protecting the motor against damage during stalling or overloading or any other abnormal conditions to which it may be subjected and which would reduce its speed below the said predetermined value.

A further object of the present invention is to provide an automatic motor control switch adapted to be actuated manually to complete the necessary circuits for motor starting purposes and likewise to break the motor circuits at will for stopping motor operation.

More particularly it is among the objects of the present invention to provide an existing speed responsive switch with manually operable means adapted to cooperate with certain parts of the switch to close and open circuits for motor starting and stopping purposes respectively, without necessitating expensive and complicated alterations in the existing switch structure to effect its cooperation with said manually operable means. The application of said manually operable motor starting means also renders said automatic switch a protective device, for the motor, inasmuch as a reduction in the speed of the motor below a predetermined minimum, due to abnormal operation of the motor as when stalling or overloaded will cause the switch to open the motor circuit to stop motor operation which cannot again be effected without the operation of said manually operable means.

Further objects and advantages of the present invention will be apparent from the following description, reference being had to the accompanying drawings wherein a preferred embodiment of the present invention is clearly shown.

In the drawings:

Fig. 4 is a fragmentary part sectional view of the switch and the manual means adapted to be actuated to move a portion of the switch for starting purposes.

Fig. 5 is a view similar to Fig. 4 showing, however, the manual means operable to affect stopping of the motor.

Fig. 6 is a perspective view of both manually operable means and their retaining element.

Fig. 7 is a view somewhat like Fig. 1 taken however, from the opposite side thereof and;

Fig. 8 is a wiring diagram illustrating the various circuits and connections of the electric motor and switch.

Figure 1:
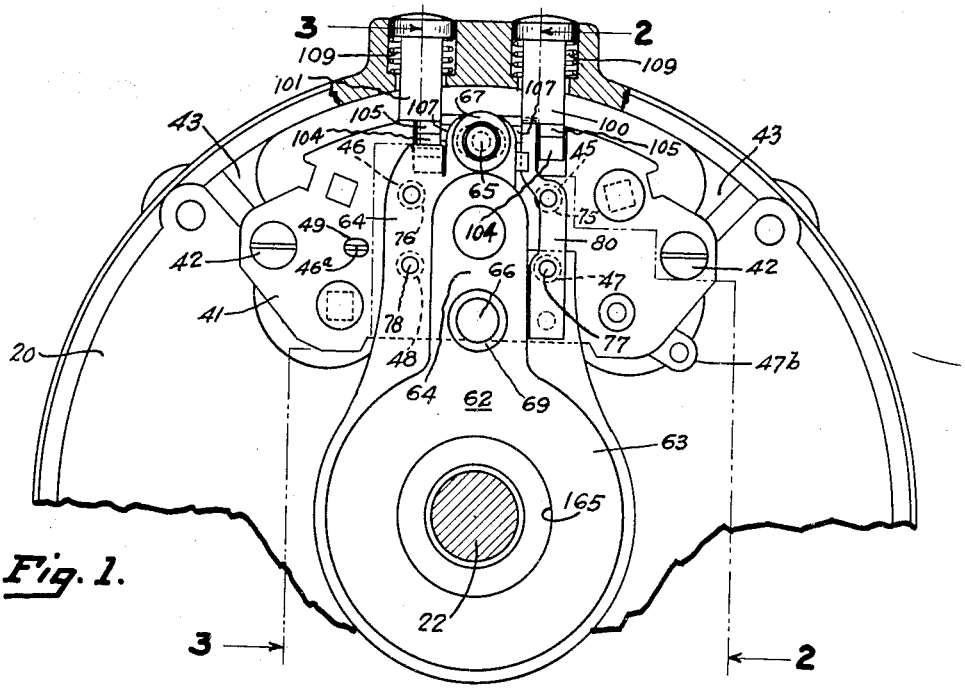
Fig. 1 is a fragmentary view of a portion of the end housing of an electric motor with the switch of the present invention applied thereto.

The switch illustrated in the present application is the one illustrated, described and claimed in the U. S. Letters Patent No. 2,182,977, filed October 23, 1936, and issued to me on December 12, 1939. To adapt it for use with the manually operable control means as illustrated, described and claimed in the present application it was found necessary to alter only a portion of one of the elements of the present switch as will hereinafter be described.

Referring to the drawings the numeral 20 designates the end frame of the electric motor equipped with the present invention. This end frame 20 has a portion 21 in which a bearing (not shown) is provided for supporting one end of the rotating shaft 22 of the motor. The field frame, rotor and opposite end frame of this motor are not illustrated in the present drawings inasmuch as they are of standard construction and form no part necessary to be illustrated to describe the present invention.

Figures 2, 3:
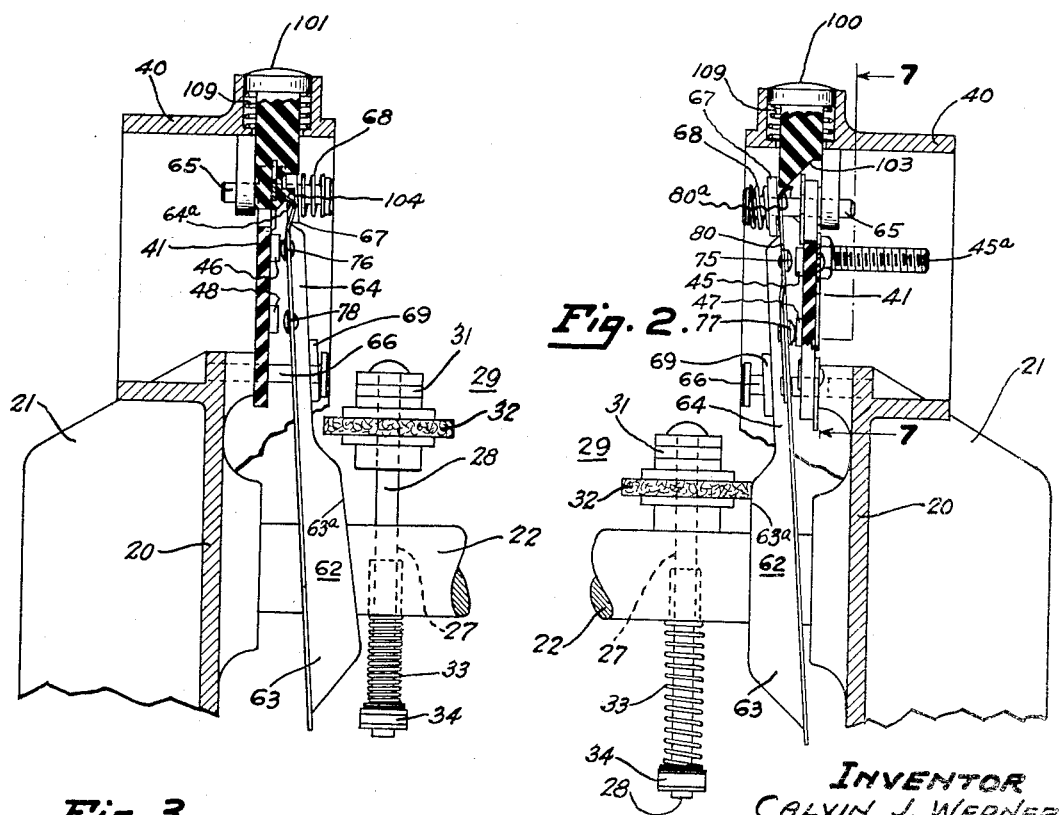
Fig. 2 is a fragmentary view, partly in section, taken along the line 2—2 of Fig. 1.
Fig. 3 is a view similar to Fig. 2, taken, however, along the line 3—3 of Fig. 1.

The motor shaft 22 is provided with a transverse opening 27 thru its axes to provide a bearing surface for a rod 28 of the centrifugal device 29. This centrifugal device comprises the rod 28 which is free to slide in the opening 27, a laminated weight 31 and a washer 32 of hard felt or similar fibrous material being secured at one end of said rod 28. On the other end of the rod there is provided a head portion in the form of an adjustable nut 34. A spring 33 surrounds the shaft 28 and is interposed between the adjustable nut 34 and the shaft 22. Normally spring 33 will hold the centrifugal device 29 in the position as shown in Fig. 2 in which the innermost weight member of the group 31 rides upon the shaft 22. However, when the shaft 22 of the electric motor starts to rotate, and as this rotation increases, the centrifugal device and particularly its group of weight members 31, will be urged outwardly due to centrifugal force overcoming the effect of the spring 33 to hold said device in the normal position. The device eventually reaches its extreme throwout position, as shown in Fig. 3, when the motor reaches a predetermined speed. From this it may be seen that the movement of the weight members 31 and the fibrous washer 32 while rotating with shaft 22 is in a path at right angles to the axis of shaft 22.

The end housing 20 also provides a switch housing 40. A plate 41, of insulating material, is secured in the end housing 20 and adjacent the switch housing 40 thereof by screws 42 which are threadedly received in lugs 43 provided by the end housing. This insulating plate 41 supports a plurality of stationary contacts which may be referred to hereinafter as pairs of stationary contacts. The two contacts of one pair supported by the insulating plate 41 are designated by the numerals 45 and 46. The other pair of stationary contacts comprises contacts 47 and 48. As shown in Fig. 7, contact 45 is connected with a terminal 45a by a strap 45b. Contact 47 is connected to a strap 47a which provides terminal 47b. Contacts 46 and 48 are connected together by a strap 46a this strap having a portion extending thru an opening 49 in the insulating plate 41 and providing a terminal. As shown in Fig. 8 the strap 46a, which connects stationary contacts 46 and 48 has a wire 50 connected to strap 46a, said wire also being connected to one end of the main or running winding 51 of the electric motor 60. The other end of the running winding 51 is connected to the motor terminal 52. Stationary contact 45 and its terminal 45a is connected by a wire 53 with the motor terminal 54. The contact 47 with its terminal 47b is connected by a wire 55 with one end of the phase or starting winding 56 of the motor 60, the other end of said starting winding being connected to the motor terminal 52. These motor terminals 52 and 54 may be connected with the respective sides of the power line as shown.

As has been mentioned in the objects of the present invention the switch in this instance is of the centrifugal type adapted to control the operation of the electric motor in accordance with and response to the speed of motor operation. Cooperating with the stationary contacts 45, 46, 47 and 48 is a bridging member 62, comprising a plate having a centrally apertured and cup-shaped body portion 63 and a neck portion 64 extending therefrom as clearly shown in the Figs. 1, 2 and 3 of the drawings. When in position in the motor, the shaft 22 extends thru the central opening 165 provided in the body portion 63 of the bridging member 62. The bridging member is movably held in position by the two headed studs 65 and 66. The reduced diameter threaded end of each stud is received by the end housing 20, the shoulders on said studs engaging the insulating plate 41 and thus said studs assist screws 42 in maintaining the insulating plate in position on the end housing 20. An insulating washer 67 is placed on the neck portion 64 of the bridging member 62 and around the stud 65, one end of a spring 68 resting upon said insulating washer 67 the other end abutting against the inner surface of the head of stud 65. The other stud 66 extends thru an opening in the neck portion 64 of the bridging member 62, an insulating washer 69 being provided on said neck portion surrounding the stud 66. Four contacts 75, 76, 77 and 78 are provided on the bridging member, being so positioned thereon that when said member is moved into one or the other of its positions they may engage with their respective stationary contacts 45, 46, 47 and 48 supported on the insulating plate 41. When the motor is inoperative the bridging member 62 is held so that its contacts 77 and 78 engage stationary contacts 47 and 48 respectively as shown in Figs. 2 and 8. In response to the motor reaching a predetermined speed, the centrifugal device moves the bridging member so that its contacts 75 and 76 engage contacts 45 and 46 respectively the contacts 77 and 78 being moved from engagement with their respective contacts 47 and 48.

One difference in the bridging member of the present invention over that of the bridging member, shown in my issued Patent No. 2,182,977 previously referred to, is the provision of a flexible contact carrying finger on the present bridging member. This contact carrying finger is designated by the numeral 80 one end thereof being secured in a suitable manner to the neck portion 64 of the bridging member 62, said flexible finger supporting the contact 75 which is adapted to cooperate with the stationary contact 45 on the insulating plate 41.

As has been mentioned heretofore, when the motor is not operating, spring 33 of the centrifugal device will maintain the innermost weight member of the group of weights 31 in riding engagement with the surface of the motor shaft 32 as shown in Fig. 2. In this position the felt or fibrous washer 32 of this centrifugal device riding upon the higher surface 63a of the disc shaped portion of the bridging member 62 holds said member so that its contacts 77 and 78 engage their respective stationary contacts 47 and 48. Under these circumstances contacts 77 and 78 act as fulcrums for the bridging member 62 so that the contacts 75 and 76 on said bridging member are held out of engagement with their respective stationary contacts 45 and 46. When, however, the motor starts to operate and as its speed of operation increases the effect of centrifugal force on the group of weights 41 will move the centrifugal device from the position as shown in Fig. 2 toward the position as shown in Fig. 3, thereby moving the fibrous washer 32 of the centrifugal device away from and out of contact with the higher surface 63a of the bridging member permitting spring 68 to become effective to move the said bridging member so that its contacts 75 and 76 will engage their respective stationary contacts 45 and 46 and while acting as fulcrum points, will cause the contacts 77 and 78 of the bridging member to be lifted out of engagement with their respective stationary contacts 47 and 48. When the centrifugal device is in this position the motor will be operating at or above a predetermined speed. While the centrifugal device is in the position shown in Fig. 2, the motor will be at rest or at least operating below the said predetermined speed.

It has been stated that it is among the objects of the present invention to provide an existing centrifugal switch with manually operable members adapted to move portions of the switch to either close or open certain necessary motor circuits to establish or stop motor operation. These manually operable members are shown in the form of two spring-loaded push buttons 100 and 101 respectively. The push button 100 is the one adapted to be operated for purposes of starting the motor, while the push button 101 is adapted to be operated for the purpose of stopping motor operation.

As shown in Fig. 6 both these push buttons 100 and 101 are identically fashioned. Their shank portions are rectangular in cross section each being provided with a head member. The lower portion of one side of each shank is cut away as at 102 to form a camming surface 103. The adjoining edge surface of the push button shank is provided with a camming surface 104 the upper end of which terminates in a notch 105. The shank of the push button has a transverse slot 106 for receiving outwardly extending arms 107 of a retainer plate 108. A spring 109 is interposed between the head portion of each push button and the bottom of a recess in the housing 20 which receives the push button. These yieldably urge said push buttons into their upper or inoperative position as shown in Fig. 1. The retaining plate 108 is secured against the insulating disc 41 by the shoulder of the guide stud 65. The arms 107 of said retaining plate 108 are narrower than the slots in the push buttons into which said arms extend, so that the said push buttons may be depressed and move relatively to said arms which are provided to limit their outward movement by the springs 109.

Fig. 2 shows the push button 100 in normal position in its recess of the end housing 20. When in this normal position the sloping cam surface 103 of said push button is engaged by the rounded end 80a of the resilient finger 80 previously described as attached to the bridging member 62 and carrying contact 75. The Fig. 4 illustrates the same push button 100 in its depressed or operated position in which the rounded end 80a of the flexible finger 80 has travelled upwardly along the sloping cam surface 103 of said push button thereby being moved inwardly toward the insulating plate 41 and consequently causing the contact 75 on said flexible finger to engage its respective stationary contact 45 on the insulating plate 41. The flexibility of the finger 80 is such that operation of the push button 100 into the position as shown in Fig. 4 will merely flex said finger but will have no moving effect upon any other portion of the bridging member.

The Fig. 3 illustrates the push button 101 in its normal position. Here the curved hook end 64a of the neck portion 64 of the bridging member 62 is riding upon the sloping cam surface 104 of the push button. When the push button 101 is moved toward its depressed position, as shown in the Fig. 5, the hook end 64a, riding upwardly on the sloping surface 104 of the shank of push button 101 will tiltingly lift the bridging member so that its contact 76 is moved out of engagement with its cooperating stationary contact 46. When the push button 101 is fully depressed its notch 105 is engaged by the hook end 64a of the bridging member so that said push button is retained in operated position and thus continued pressure need not be exerted. Tiltingly lifting of the bridging member to disengage contact 76 from fixed cooperating contact 46 will not appreciably move any other portion of the bridging member and therefore its contacts 75, 77 and 78 will maintain their engagement with the respective stationary contacts 45, 47 and 48. The separation of contacts 76 and 46 as will be described fully hereinafter, breaks the connection between the one side of the power line and the electric motor, thus causing the motor to stop. As soon as its speed is reduced predeterminately, the centrifugal device as it moves from the position shown in Fig. 3 to the position shown in Fig. 2, due to such reduction in motor speed, will cause the bridging member to be shifted from the position shown in Fig. 3, to the position shown in Fig. 2, thereby tilting said member with its contacts 78 and 77 acting as fulcrums and consequently lifting the hook end 64a of the bridging member from the notch 105. As soon as this happens, the push button 101 is released and its spring 109 will again return it to normal inoperated position.

The complete operation of the switch will now be described, reference being had in particular to the Fig. 8. When the motor is at rest, the switch, as has been described, will be in the position as shown in Figs. 2 and 8. In this position contacts 77, 78 of the bridging member are in engagement with their respective contacts 47 and 48. Under these circumstances the phase or starting winding of the motor 56 is in parallel connection with the running winding 51 thru the following circuit: wire 55, contact 47, via the terminal 47b, stationary contact 77, bridging member 62 to contact 78, contact 48, thru its strap 46a, wire 50 to the running winding 51 of the motor. Both these field windings 51 and 56 are connected with a common terminal 52 of the motor to which one side of the power line may be connected. The other side of the power line is connected to the motor terminal 54 which in turn is connected with the stationary contact 45 thru wire 53, leading to terminal 45a of contact 45. This contact 45, however, is not normally engaged by the bridging contact 75, mounted upon or carried by the flexible finger 80 of the bridging member, due to the fact that the bridging member is being held in its normal position by the centrifugal element 29 when the motor is not operating. Neither is the stationary contact 46 engaged by its cooperating bridging member contact 75 under these circumstances. Now, when it is desired to operate the motor the push button 100 is depressed, thereby causing the flexible finger 80 to be biased and brings its contact 75 into engagement with the stationary contact 45, the normal position of the bridging member however not being altered by such movement of its flexible finger. Engagement of contact 75 with contact 45 completes the following motor circuits. From the power line connected with the motor terminal 54 thru wire 53 the terminal 45a of stationary contact 45 to the engaging contact 75 on the flexible finger 80 thru said flexible finger to the main body portion 64a of the bridging member thence thru contact 78 to stationary contact 48, thru the arm 46a, wire 50, running winding 51 of the motor to the terminal 52 connected to the opposite side of the power line. Another motor circuit is completed from the contact 77 on the bridging member to contact 47 engaged thereby, to terminal 47b then thru wire 55 to the phase or starting winding 56 which is connected to the terminal 52 of said other side of the power line. With these circuits completed the motor will operate. As its speed increases, the centrifugal device 29 will be moved from the position shown in Fig. 2 to the position shown in Fig. 3, during which time the bridging member 62 is released by the centrifugal device and permitted to assume the position as shown in Fig. 3 under the effect of spring 68. In assuming this position the bridging member will cause engagement of its contact 76 with the stationary contact 46, contact 75 of the bridging member being previously moved manually and now being held automatically in engagement with its cooperating contact 45. These contacts 75 and 76 now acting as fulcrums, bridging member 62 under the effect of spring 68 will move its contacts 77 and 78 out of engagement with their respective stationary contacts 47 and 48 thereby completely breaking the circuit connection with the phase or starting winding 56. However, the circuit connection to the running winding 51 is still maintained for the wire 50, leading from said running winding, is connected with the terminal 46a which is common to both stationary terminals 46 and 48. Thus, when in this position, the bridging member will complete the following circuit. From the power line connected to the motor terminal 54, to terminal 45a of contact 45, thence thru the contact 75 on spring finger 80, bridging member and its contact 76 to the contact 46 thru the strap 46a and wire 50 connected thereto thru the running winding 51 of the motor to the motor terminal 52 connected to the opposite side of the power line.

When it is desired to stop motor operation, the user depresses the button 101 until it engages the hook end 64a of the bridging member and is locked in this position by said hook member entering the notch 105 in said push button 101. As has been stated heretofore depression of button 101 will lift the bridging member with a tilting effect causing a separation of its contact 76 from the cooperating stationary contact 46. The engagement of contact 75 with its contact 45 is not affected. Now the circuit from the power line at terminal 54 thru the wire 53, contact 45 to contact 75 and finger 80 is broken for contact 76 no longer engages contact 46, hence the circuit to the motor proper is completely broken and the motor consequently rendered inoperative. As its speed decreases the control device 29 will move from the position as shown in Fig. 3 to that shown in Fig. 2, and in so moving said centrifugal device thru its fibrous washer 32 will move the bridging member from the position shown in Fig. 3 to that shown in Fig. 2. As a consequence the hook end 64a of the bridging member is withdrawn from notch 105 in push button 101 and the push button is released and permitted to be returned to normal position by its spring 109. The bridging contacts 75 and 76 are moved from engagement with their respective stationary contacts 45 and 46 and contacts 47 and 48 on the insulating plate 41 are again engaged by their bridging contacts 77 and 78.

Thus when the speed of the motor is reduced so as to cause the centrifugal member 29 of the switch to actuate the bridging member to disengage contacts 75 and 76 from their cooperating contacts 45 and 46 respectively and to cause contacts 77 and 78 to engage their cooperating stationary contacts 47 and 48 respectively, the motor cannot again be made operative without the manual actuation of the push button 100. Consequently any condition such as stalling or overload which would tend to damage the motor and which results in a decrease in its speed of operation is immediately eliminated by the complete disconnection of the motor from the power circuit. To again reestablish motor operation requires manual operation of the switch.

From the aforegoing it may be seen that very little change in the construction of the existing switch as shown in my Patent No. 2,182,977 previously referred to was made. With the addition of two manually operable push buttons applicant has provided a new, simple and economical switch adapted automatically to contol motor operation in accordance with the speed of the motor and having provisions adapted to be operated manually to actuate a portion of the centrifugal switch to close circuits for effecting motor starting and also to operate another portion of the centrifugal switch to open the circuits to stop motor operation, also an automatic protective device which avoids all damage to the motor caused by its stalling, overload or reduction in speed due to any abnormal operation.

While the embodiment of the present invention as herein disclosed, constitutes a preferred form, it is to be understood that other forms might be adopted, all coming within the scope of the claims which follow.

What is claimed is as follows:

1. A control device for an electric motor having starting and running windings adapted to be connected with a source of electric power comprising in combination, a centrifugal switch comprising a contactor having a rigid portion and a flexible portion and also stationary contacts normally disengaged to disconnect both of said windings from the source of power; speed responsive means adapted at a predetermined motor speed to actuate the contactor to complete only the circuit through the running winding by connecting it with said source of power; manually operable means for actuating the flexible portion of the centrifugal switch contactor to connect both the starting and the running windings to the source of power for motor starting purposes; and a second manually operable means for actuating the rigid portion of the contactor to open all circuit connections of the motor with the power source to stop motor operation.

2. In combination with a centrifugal switch having a member adapted to be actuated to disconnect both the starting and the running windings of an electric motor from a source of electric power when the speed of the motor falls below a predetermined value and to connect only the running winding to said power source when the motor rotates at said predetermined speed; of a manually operable member adapted while operated to engage and actuate only a portion of said switch member to connect both the starting and running windings to the source of power for motor starting purposes; and a second manually operable member adapted when actuated to move the complete member of the switch to disconnect the source of power from the motor to stop motor operation.

3. In combination with a centrifugal switch having a movable member normally disconnecting both the starting and the running windings of an electric motor from a power line but adapted, at a predetermined speed of motor rotation to connect only the running winding to said power line; of a push button, while manually operated, adapted to flex a portion of the movable member of the switch out of normal position to connect the power line with both the starting and running windings for motor starting purposes; and a second push button adapted, when manually operated, to move the entire movable member of the switch to disconnect the power line from the motor winding to stop motor operation.

4. A device in accordance with claim 3 in which, however, means are provided to engage and retain the second push button in its operated, circuit breaking position, until released by the actuation of the switch to normal position by the reduction of the speed of motor operation below the said predetermined value.

5. In combination with a centrifugal switch having movable and stationary members normally disengaged to disconnect both the starting and the running windings of an electric motor from a power line but adapted, at a predetermined speed of motor rotation to connect only the running winding to said power line; a resilient portion on said movable switch member; two spring loaded members, one of which, while manually actuated, being adapted to engage and flex the resilient portion of the movable member of said switch to connect the one side of the power line with both the starting and the running windings of the motor for motor starting purposes, the other member being adapted, when actuated, to engage and move the movable member of the switch for disconnecting the power line from the motor to stop motor operation; and a detent on said other member engaged by the switch when said member is actuated, for retaining the said member in operative position until released by said switch when actuated to normal position by reduction in the speed of motor operation.

6. In combination with a centrifugal switch provided in a motor housing, said switch having relatively movable members normally disconnecting both starting and running windings of the motor from the power line but adapted to connect the running winding with said power line when the motor reaches a predetermined speed; of two identically fashioned push buttons slidably carried by the motor housing; a resilient finger on one of the switch members engaged and moved by a surface of the one push button, when actuated, to connect the power line with both motor windings for motor starting purposes; and a hook member on the said one member of the switch adapted to be engaged and actuated by the other push button when operated, for moving the switch to break the connection between the one power line and the motor for stopping motor operation, said push button being retained in operated position by said hook member until the switch is moved to normal position in response to the motor speed dropping below said predetermined value.

7. In combination with a centrifugal switch having a movable member normally disconnecting both the starting and the running windings of an electric motor from a power line but adapted, at a predetermined speed of motor rotation to connect only the running winding to said power line; a resilient finger on said movable member of the switch; a rigid hook member on said switch member; two identically fashioned, spring loaded push buttons, each having a sloping, camming surface and a second camming surface terminating in a notch, the one push button, when actuated, having its camming surface engaging and moving the resilient finger of the switch member to connect the power line with both motor field windings for motor starting purposes, the second push button, when actuated, having its notched camming surface engaging and moving the rigid hook member of the switch member to move said member and break the connection of the said one power line with the motor to stop motor operation, the notch in said camming surface holding the push button in its operated position until the switch member is moved to normal position by a reduction in motor speed at which time said push button is released.

8. In a motor control switch the combination with a plurality of stationary contacts; a movable bridging member normally engaging two of said stationary contacts and movable out of engagement with said two contacts and into engagement with the third and fourth of said contacts in response to the motor reaching a predetermined speed; means for moving said bridging member in accordance with the speed of motor operation; a flexible finger on said movable bridging member; manually operable means for flexing the finger to engage the said third of the stationary contacts to connect it to the said two contacts normally engaged by the bridging member; a rigid hook portion on said bridging member; and a second manually operable means for engaging said hook and moving the bridging member partially out of its operated position and disengage it from the fourth of said stationary contacts whereby the connection between the third and fourth of said contacts and the said two stationary contacts is completely broken.

9. A control switch for a motor having starting and running windings, comprising a shiftable bridging member having rigid and flexible portions; two stationary contacts normally engaged by the bridging member, said contacts being respectively connected to the starting and running windings of the motor; two stationary contacts adapted to be engaged by the bridging member when moved from normal to operated position; one of these stationary contacts being connected to the one of the first mentioned stationary contacts connected to the running winding of the motor, the other contact being adapted to be connected to a source of electrical energy; speed responsive means for actuating the bridging member between normal and operated positions; manually operated means for actuating the flexible portion of said bridging member to engage the stationary contact connected to the source of electrical energy while the bridging member is in normal position for motor starting; and a second manually operable means adapted to be actuated bodily to move the bridging member to disengage the stationary contact connected to the running winding while the said bridging member is in its operated position for stopping motor operation.

10. A switch in accordance with claim 9, in which, however, means are provided for retaining the second manually operable means in its actuated position until released by the speed responsive means becoming effective to shift the bridging member at a predetermined reduction of the speed of the motor.

CALVIN J. WERNER.